US007921952B2

(12) United States Patent
Tseng et al.

(10) Patent No.: US 7,921,952 B2
(45) Date of Patent: Apr. 12, 2011

(54) PARKING ASSISTANCE SYSTEM

(75) Inventors: Chyuan-Yow Tseng, Pingtung (TW);
Hsing-Hui Huang, Pingtung (TW);
Chien-Hsiung Tsai, Pingtung (TW)

(73) Assignee: National Pingtung University of Science & Technology, Pingtung County (TW)

( * ) Notice: Subject to any disclaimer, the term of this patent is extended or adjusted under 35 U.S.C. 154(b) by 67 days.

(21) Appl. No.: 12/414,228

(22) Filed: Mar. 30, 2009

(65) Prior Publication Data
US 2010/0155165 A1 Jun. 24, 2010

(30) Foreign Application Priority Data
Dec. 18, 2008 (TW) .............................. 97149410 A (51) Int. Cl.
*B60S 9/205* (2006.01)
(52) U.S. Cl. .................... 180/199; 180/200; 180/202
(58) Field of Classification Search .................. 180/199, 180/200, 202
See application file for complete search history.

(56) References Cited

U.S. PATENT DOCUMENTS

| | | | | | |
|---|---|---|---|---|---|
| 1,764,486 | A | * | 6/1930 | Woolley | 180/200 |
| 2,692,143 | A | * | 10/1954 | Rando | 280/754 |
| 3,029,886 | A | * | 4/1962 | Hansen | 180/200 |
| 3,240,287 | A | * | 3/1966 | Lepore et al. | 180/202 |
| 3,343,618 | A | * | 9/1967 | Livnat | 180/200 |
| 3,623,562 | A | * | 11/1971 | Pitra | 180/200 |
| 3,738,284 | A | * | 6/1973 | Atsuta et al. | 105/177 |
| 3,826,322 | A | * | 7/1974 | Williams | 180/202 |
| 4,605,086 | A | * | 8/1986 | Marom | 180/202 |
| 5,419,580 | A | * | 5/1995 | Ku | 280/761 |
| 5,868,600 | A | * | 2/1999 | Watanabe | 446/460 |
| 6,196,346 | B1 | * | 3/2001 | Goldenberg | 180/199 |
| 7,155,325 | B2 | | 12/2006 | Tanaka et al. | |
| 7,243,747 | B2 | * | 7/2007 | Bender et al. | 180/15 |
| 7,363,130 | B2 | | 4/2008 | Sakakibara | |

FOREIGN PATENT DOCUMENTS
TW 569988 1/2004
TW 578733 1/2004
* cited by examiner

*Primary Examiner* — Paul N Dickson
*Assistant Examiner* — Marlon A Arce
(74) *Attorney, Agent, or Firm* — Muncy, Geissler, Olds & Lowe, PLLC (57) ABSTRACT

A parking assistance system includes front and rear auxiliary wheel assemblies mounted to a chassis of the vehicle and adjacent front and rear wheels of the vehicle. Each of the front and rear auxiliary wheel assemblies includes two auxiliary wheels and an auxiliary motor coupled to the auxiliary wheels for driving the auxiliary wheels to rotate in a forward or backward direction. A plurality of lift devices are mounted between the auxiliary wheels and the chassis and control upward and downward movement of the auxiliary wheels. At least one parking assistance controller is coupled to the auxiliary motors. A control unit is coupled to the at least one parking assistance controller and manually operable to control a rotating direction and speed of the auxiliary motors via the at least one parking assistance controller, controlling a moving distance and direction of the auxiliary wheels in the forward or backward direction.

5 Claims, 10 Drawing Sheets

FIG. 10

PARKING ASSISTANCE SYSTEM

BACKGROUND OF THE INVENTION

1. Field of the Invention

The present invention relates to a parking assistance system and, more particularly, to a parking assistance system for a vehicle to allow the vehicle to be moved in a transverse direction, so that the vehicle can be rapidly moved into a parking space.

2. Description of the Related Art

Most automobiles include a radar device or a monitor for assisting in movement in backgear, which is helpful to drivers not skilled in parking. However, the radar device or the monitor may not always be useful in all kinds of parking situations. Furthermore, more fuel is consumed and more air pollution is caused when more time is spent on parking. Further, it is always a problem to find a parking space in cities. To solve this problem, rapid parking designs including automatic parking systems and wheels that can be rotated through 90 degrees have been proposed to allow rapid parking. However, in addition to complicated structures and high costs, these rapid parking designs face challenge in reliability and safety.

Taiwan Patent Publication No. 578733 entitled "Transverse Movement Structure for Vehicle" discloses two transverse movement mechanisms mounted on a beam between two rear wheels of a vehicle and a bi-directional hydraulic cylinder mounted between the transverse movement mechanisms. Each transverse movement mechanism includes a lift arm, a transverse wheel, and a power mechanism. The hydraulic cylinder includes left and right piston rods respectively attached to the lift arms of the transverse movement mechanisms. When the left and right piston rods are moved outward, the transverse movement mechanisms move downward and come into contact with the ground to lift the rear wheels away from the ground. The transverse wheels are then moved by the power mechanisms so that the rear of the vehicle can be moved leftward or rightward. When parking the vehicle, such as roadside parking, the vehicle is driven into a parking space with the head of the vehicle at an angle with a longitudinal direction of the parking space. The transverse movement mechanisms are then actuated to rotate the rear of the vehicle into the parking space. However, the driver has to judge whether there is enough room for rotational movement of the rear of the vehicle to avoid repeated operations. Furthermore, the parking operation is also affected by the angle between the head of the vehicle and the longitudinal direction of the parking space. Specifically, if the angle is too small, the head of the vehicle will be located outside of the parking space. On the other hand, if the angle is too large, the sideview mirrors may impact obstacles on the road. Namely, operation of the transverse movement structure still needs the parking skill and judgment of the driver to park the vehicle in a better location, which is difficult to drivers not skilled in parking.

Taiwan Patent Publication No. 569988 entitled "Assistance Device for Parking Vehicle" discloses two parking assistance devices respectively adjacent to front wheels and rear wheels of a vehicle. Each parking assistance device includes a transverse rod having a screw rod mounted therein. The screw rod includes two ends with different thread leads. The screw rod is driven by a main reduction motor. Two swaying rods are mounted to the transverse rod. Each swaying rod is pivotably coupled by a sleeve to one of the ends of the screw rod. Furthermore, each swaying rod is coupled to an auxiliary wheel and a reduction motor. When the main reduction motor drives the screw rod to rotate, the swaying rods are moved downward. The auxiliary wheels come into contact with the ground to lift the front and rear wheels above the ground. The auxiliary wheels are then driven by the reduction motors to move the whole vehicle leftward or rightward into the parking space. However, the parking assistance devices only allow sideway movement of the whole vehicle. Namely, the vehicle must be parked in a position parallel to the longitudinal direction of the parking space. Particularly, if the vehicle is stopped in a position at an angle with the longitudinal direction before parking, the vehicle will be at an angle with the longitudinal direction of the parking space after the vehicle is moved into the parking space.

SUMMARY OF THE INVENTION

The primary objective of the present invention is to provide a parking assistance system allowing a driver of a vehicle to adjust the moving angle and the moving distance of the head and the rear of the vehicle according to the practical situations, so that the vehicle can be parked in the best location of the parking space.

Another objective of the present invention is to provide a parking assistance system that can be operated by a driver without parking skill and experience within a short period of time.

A parking assistance system according to the preferred teachings of the present invention includes a front auxiliary wheel assembly adapted to be mounted to a chassis of the vehicle and adjacent two front wheels of the vehicle. The front auxiliary wheel assembly includes two front auxiliary wheels and a first auxiliary motor coupled to the two front auxiliary wheels. At least one of the front auxiliary wheels is drivable by the first auxiliary motor to rotate in a forward or backward direction. The parking assistance system further includes a rear auxiliary wheel assembly adapted to be mounted to the chassis of the vehicle and adjacent two rear wheels of the vehicle. The rear auxiliary wheel assembly includes two rear auxiliary wheels and a second auxiliary motor coupled to the two rear auxiliary wheels. At least one of the rear auxiliary wheels is drivable by the second auxiliary motor to rotate in the forward or backward direction. A plurality of lift devices are mounted between the front and rear auxiliary wheels and the chassis and control upward and downward movement of the front and rear auxiliary wheels between a first position above the ground and a second position on the ground, with the front and rear wheels of the vehicle being above the ground when the front and rear auxiliary wheels are in the second position, and with the front and rear wheels of the vehicle being on the ground when the front and rear auxiliary wheels are in the first position. A first auxiliary motor driver is coupled to the first auxiliary motor, and a second auxiliary motor driver is coupled to the second auxiliary motor. At least one parking assistance controller is coupled to the first and second auxiliary motor drivers. A control unit is coupled to the at least one parking assistance controller and manually operable to control rotating directions and speeds of the first and second auxiliary motors via the at least one parking assistance controller, controlling moving distances and directions of the front and rear auxiliary wheels in the forward or backward direction.

In a preferred form, the at least one parking assistance controller includes first and second parking assistance controllers respectively coupled to the first and second auxiliary motor drivers. The control unit includes first and second sensor units are mounted on left and right sides of the vehicle. Each of the first and second sensor units includes a first sensor coupled to the first auxiliary motor and a second sensor coupled to the second auxiliary motor. Furthermore, the first and second sensors of each of the first and second sensor units are located on a same level and spaced from each other, with the first sensor adjacent a head of the vehicle and with the second sensor adjacent a rear of the vehicle. Further, each of the first and second auxiliary motors includes a braking device.

In another preferred form, the at least one parking assistance controller includes a parking assistance controller coupled to the first and second auxiliary motor drivers. The control unit includes first and second sensors mounted on left and right sides of the vehicle. Each of the first and second sensors includes a first sensing area coupled to the first auxiliary motor and a second sensing area coupled to the second auxiliary motor.

In a further preferred form, the at least one parking assistance controller includes a parking assistance controller coupled to the first and second auxiliary motor drivers. The controller includes a transmitter and a receiver receiving signals from the transmitter. The receiver is coupled to the parking assistance controller. The transmitter is manually operable to control the rotating direction and speed of the first and second auxiliary motors via the parking assistance controller, controlling the moving distance and direction of the front and rear auxiliary wheels in the forward or backward direction.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "front", "rear", "end", "portion", "longitudinal", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A parking assistance system according to the preferred teachings of the present invention is shown in the drawings. According to the preferred form shown, the parking assistance system is mounted to a vehicle 8 and includes a front auxiliary wheel assembly 1, a rear auxiliary wheel assembly 2, a control unit, and a plurality of lift devices 4.

Figure 1:
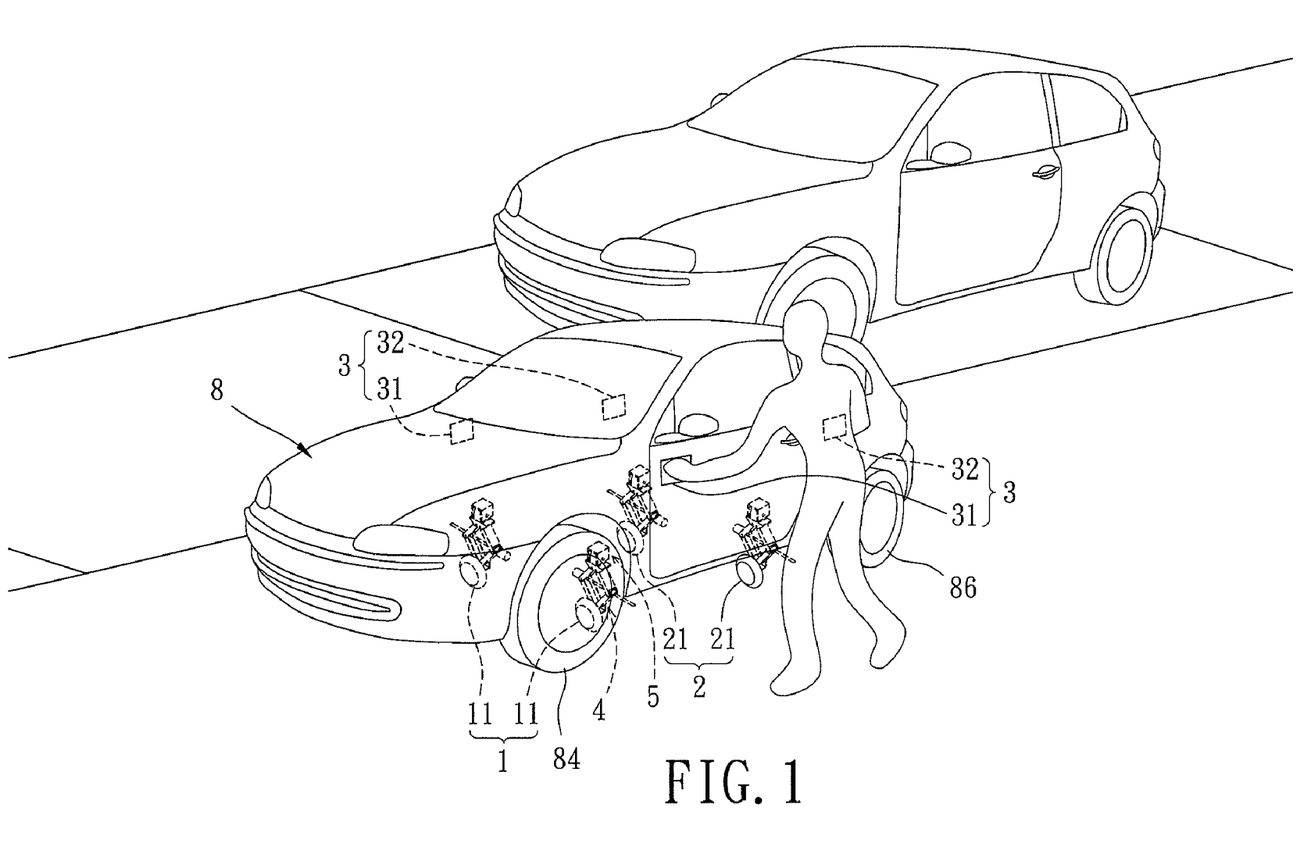
FIG. 1 shows a perspective view of a vehicle with a parking assistance system of a first embodiment according to the preferred teachings of the present invention.

According to the preferred forms shown, the front and rear auxiliary wheel assemblies 1 and 2 are mounted to a chassis 82 of the vehicle 8, with the front auxiliary wheel assembly 1 adjacent two front wheels 84 of the vehicle 8 and with the rear wheel assembly 1 adjacent two rear wheels 86 of the vehicle 8. The front and rear wheel assemblies 1 and 2 are identical in the preferred form shown. Specifically, the front auxiliary wheel assembly 1 includes two front auxiliary wheels 11 and a first auxiliary motor 12 coupled to the front auxiliary wheels 11. The rear auxiliary wheel assembly 2 includes two rear auxiliary wheels 21 and a second auxiliary motor 22 coupled to the rear auxiliary wheels 22. The auxiliary wheels 11 and 21 can rotate in a forward or backward direction to move the vehicle 8 in a leftward or rightward direction of the vehicle 8. The first auxiliary motor 12 can drive one or both of the front auxiliary wheels 11 to rotate in either of two opposite directions. Similarly, the second auxiliary motor 22 can drive one or both of the rear auxiliary wheels 21 to rotate in either direction. In an alternative form, each auxiliary wheel 11 and 21 is driven by an auxiliary motor to rotate in either direction.

Figure 2A:
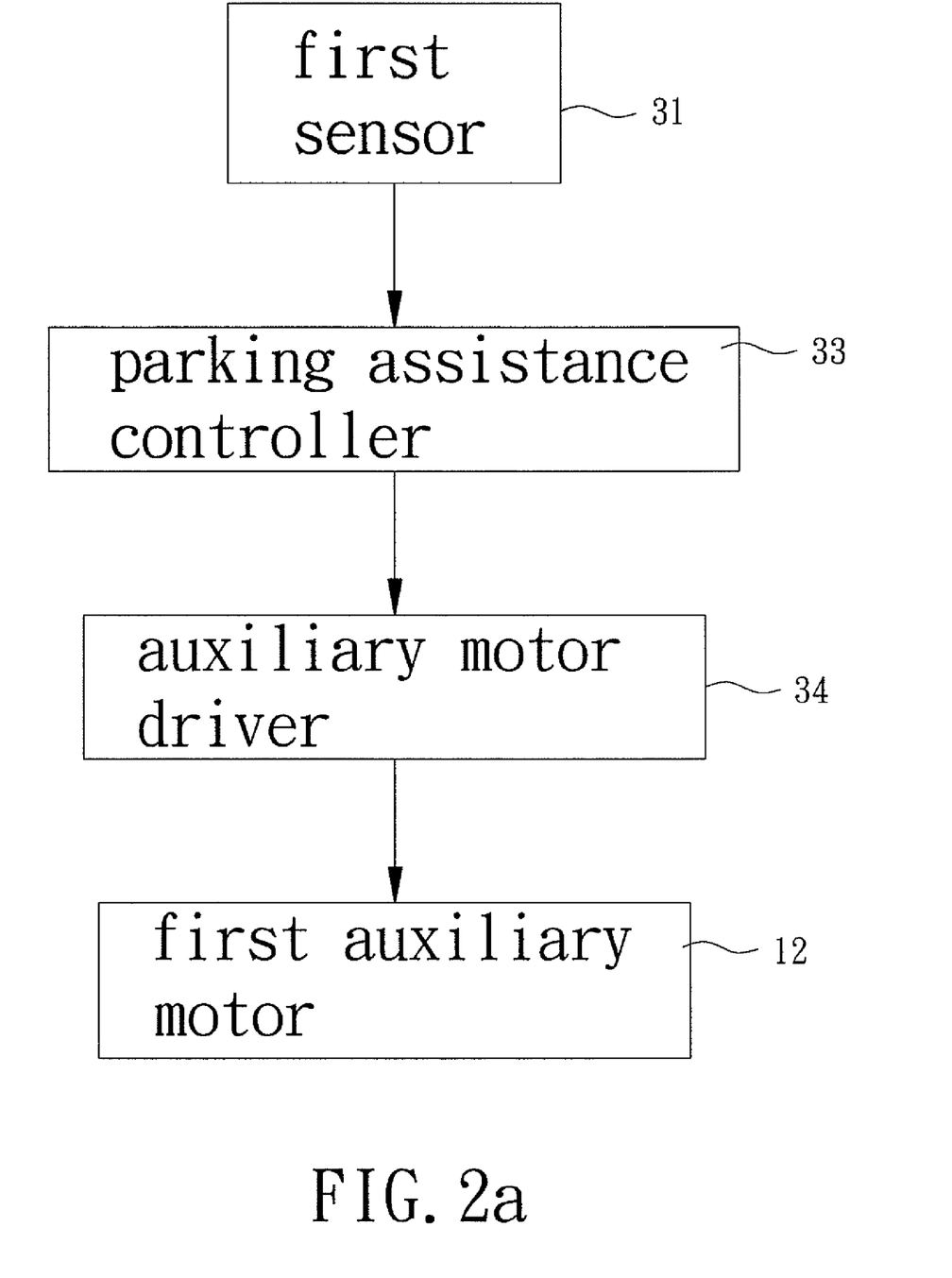
FIGS. 2a and 2b show a block diagram of a portion of the parking assistance system of FIG. 1.
Figure 2B:
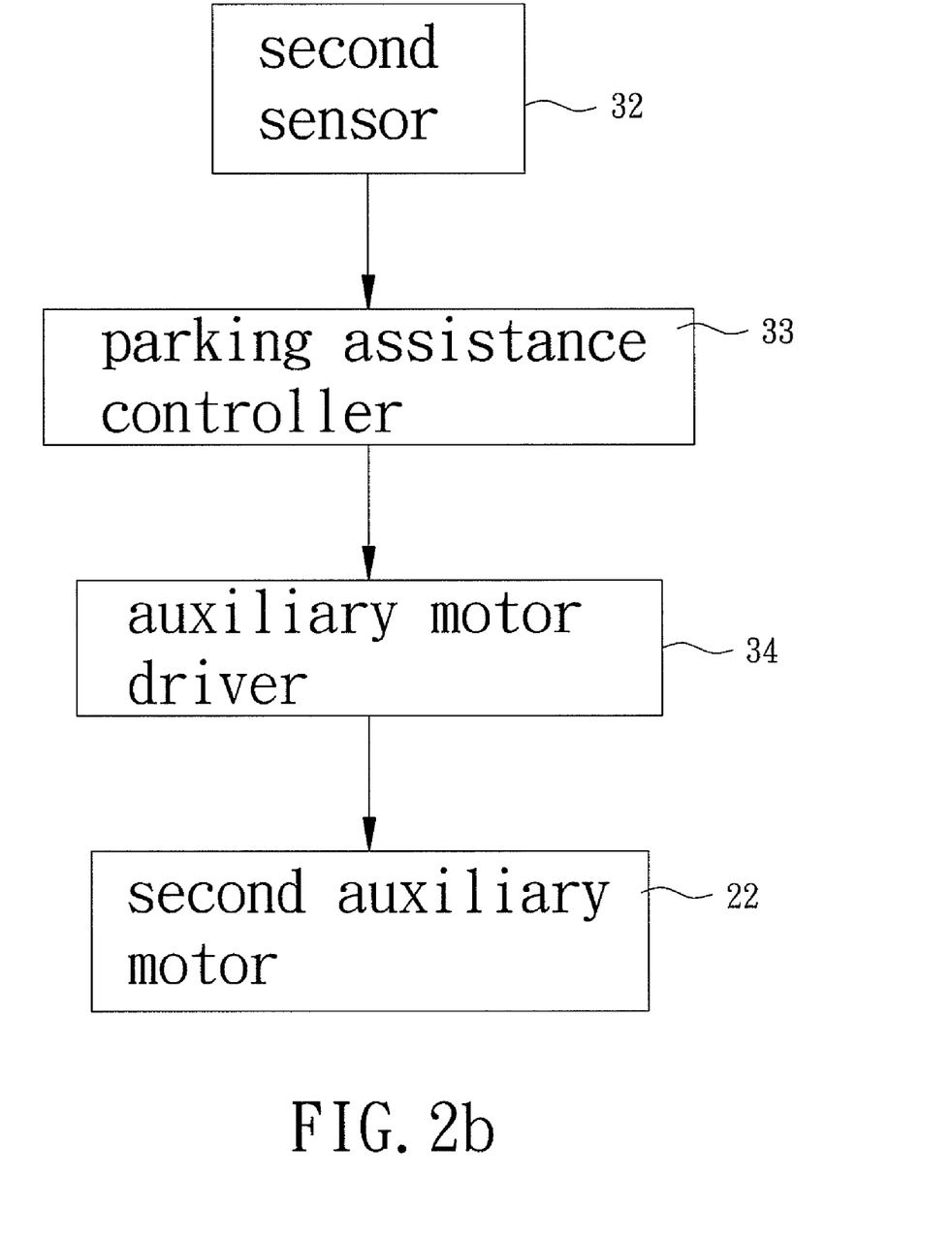

In the preferred form shown, the control unit includes two sensor units 3. The sensor units 3 are respectively mounted to left and right sides of the vehicle 8. Each sensor unit 3 includes first and second sensors 31, 32 in the preferred form shown at the same level and spaced in a longitudinal direction of the vehicle 8, with the first sensor 31 adjacent a head of the vehicle 8 and with the second sensor 32 adjacent a rear of the vehicle 8. The first sensor 31 of the sensor units 3 is coupled to a first parking assistance controller 33 that is coupled to a first auxiliary motor driver 34, which in turn, is coupled to the first auxiliary motor 12 of the front auxiliary wheel assembly 1. The second sensor 32 of the sensor units 3 is coupled to a second parking assistance controller 33 that is coupled to a second auxiliary motor driver 34, which in turn is coupled to the second auxiliary motor 22 of the second auxiliary wheel assembly 2.

According to the preferred form shown, the parking assistance system includes four lift devices 4 mounted to the chassis 82 of the vehicle 8 with the front and rear auxiliary wheels 11 and 21 respectively coupled to and drivable by the lift devices 4 to move upward or downward. Each lift device 4 includes a fixed seat 41 fixed to the chassis 82, two arms 42, a motor 43, and a screw rod 44. Each arm 42 has a first end pivotably connected to the fixed seat 41 and a second end pivotably connected to one of the front and rear auxiliary wheels 11 and 21. A joint 45 is mounted to an intermediate portion of each arm 42. The motor 43 is coupled to the joint 45 of one of the arms 42, and the joint 45 of the other arm 42 includes a screw hole for threadedly engaging with the screw rod 44 driven by the motor 43.

Figure 3:
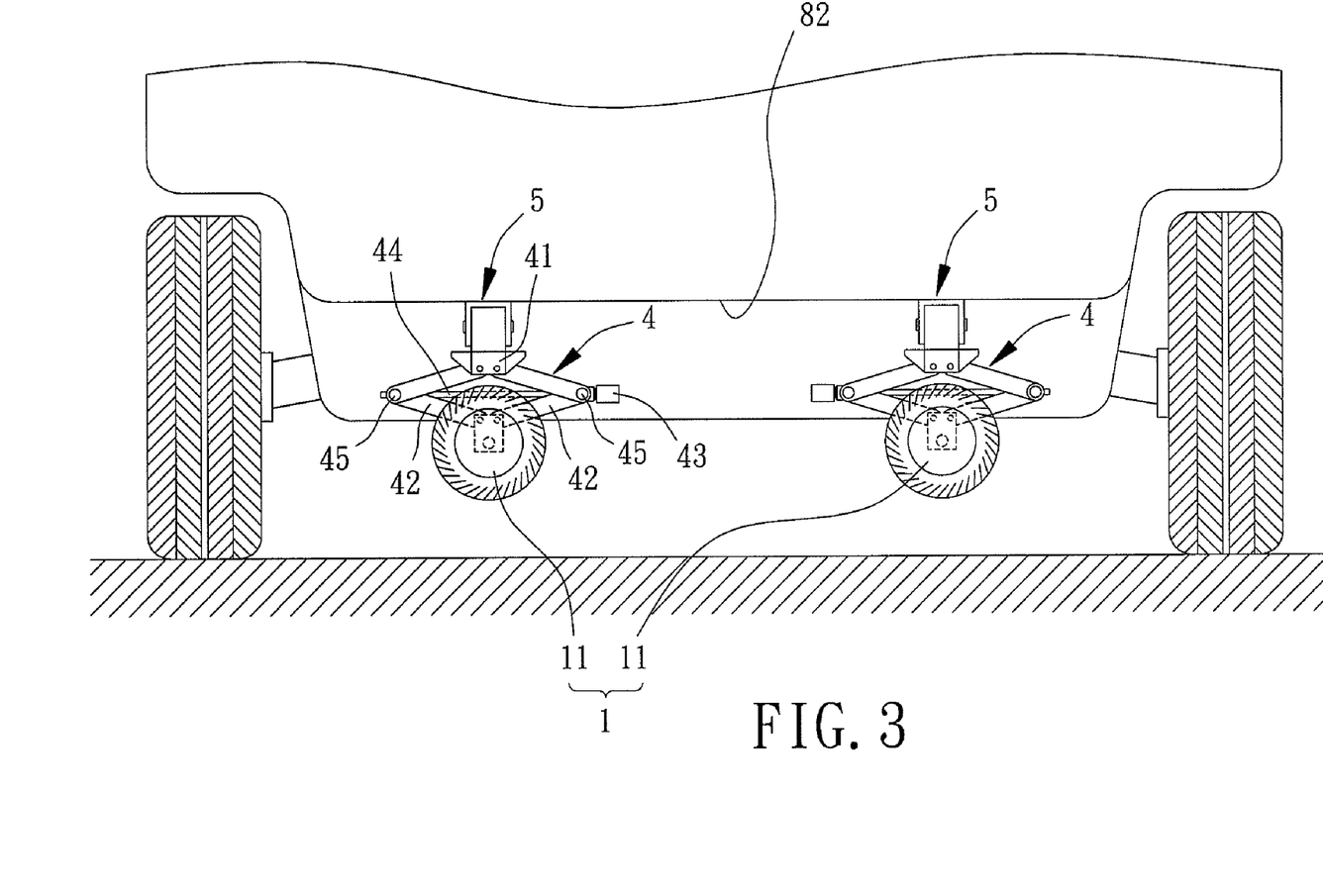
FIG. 3 shows a partial, front view of the vehicle of FIG. 1 with front wheels of the vehicle above the ground.
Figure 4:
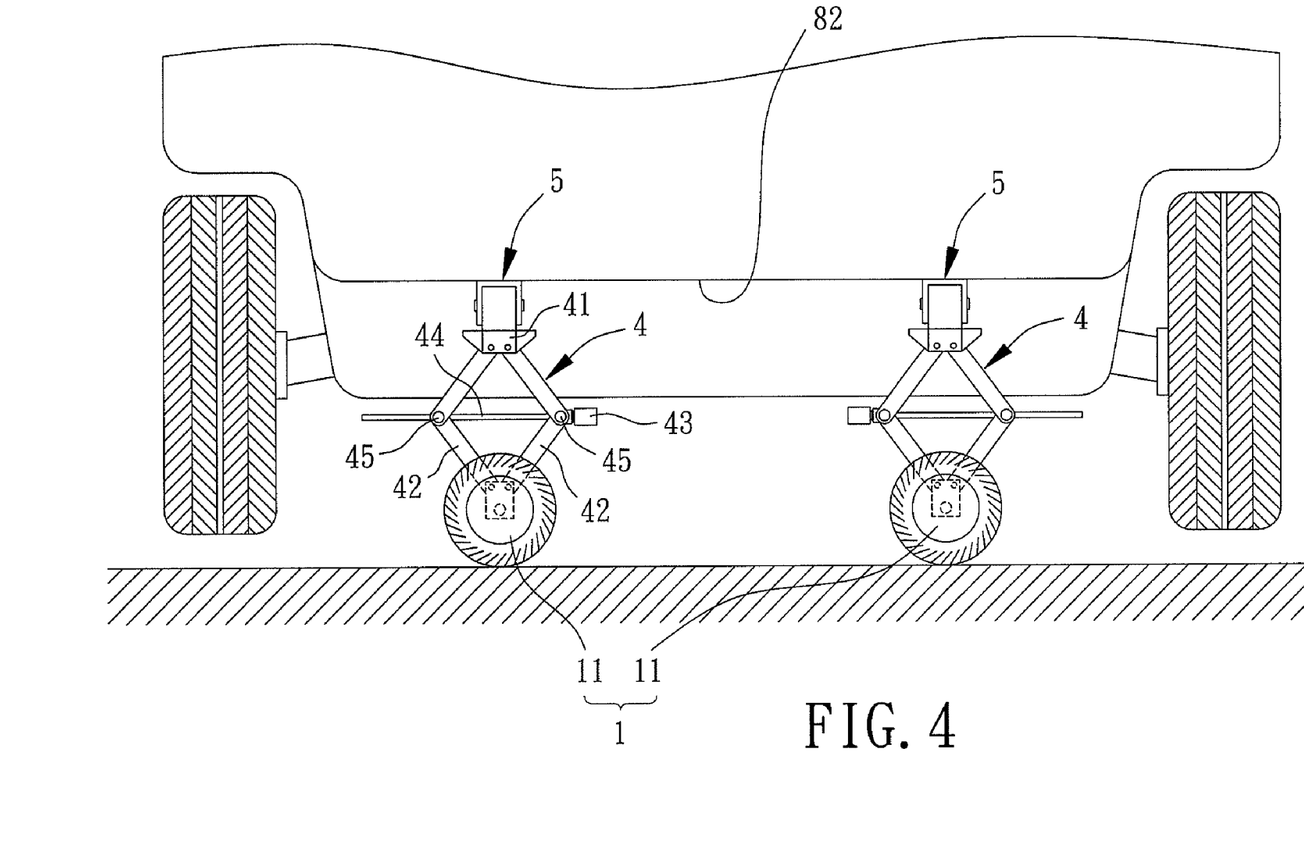
FIG. 4 shows a partial, front view of the vehicle of FIG. 1 with the front wheels of the vehicle on the ground.

When the motors 43 of the lift devices 4 drive the screw rods 44 to rotate in a direction, the joints 45 of the arms 42 of each lift device 4 are moved away from each other, so that the front and rear auxiliary wheels 11 and 21 move upward (FIG. 3). When the motors 43 of the lift devices 4 drive the screw rods 44 to rotate in a reverse direction, the joints 45 of the arms 42 of each lift device 4 are moved towards each other, so that the front and rear auxiliary wheels 11 and 21 move downward and come in contact with the ground to lift the vehicle 8 above the ground (FIG. 4). Thus, the front and rear wheels 84 and 86 are above the ground. Next, the front and rear auxiliary wheels 11 and 21 are moved to carry the vehicle 8 leftward or rightward. It can be appreciated that the auxiliary wheels 11 and 21 have suitable spacing therebetween to support the weight of the vehicle 8.

Figure 5:
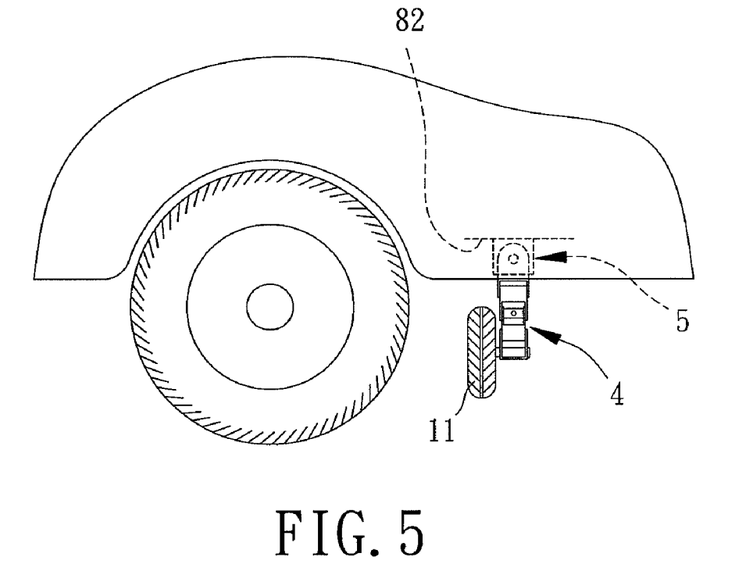
FIG. 5 shows a partial, side view of the vehicle of FIG. 1 with the front wheels of the vehicle above the ground.
Figure 6:
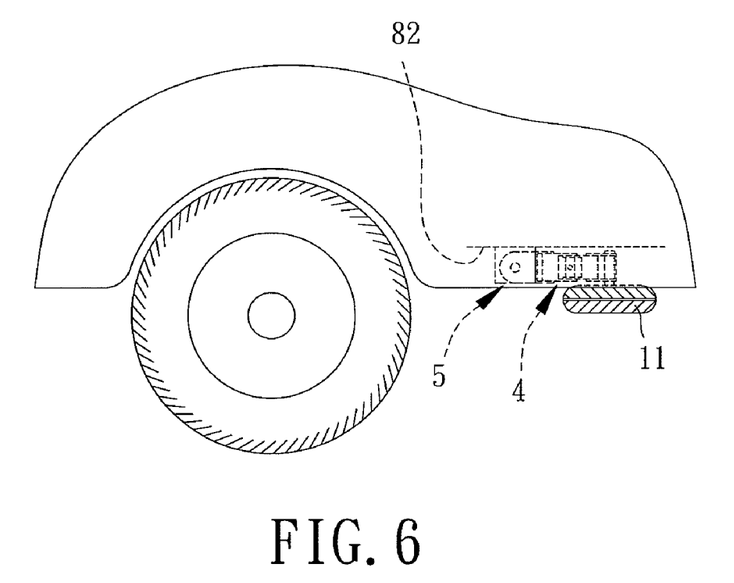
FIG. 6 shows a partial, side view of the vehicle of FIG. 1 with the front wheels of the vehicle in the storage position.

According to the preferred forms shown, a folding device 5 is mounted between each lift device 4 and the chassis 82. Specifically, the fixed seat 41 of each lift device 4 is pivotably mounted to one of the folding devices 5 that is fixed to the chassis 82, allowing pivotal movement of the fixed seat 41 relative to the chassis 82, so that each auxiliary wheel 11, 21 is movable between an operative position (FIG. 5) and a storage position (FIG. 6) in contact with the chassis 82 to avoid damage to the auxiliary wheel 11, 21 by an object or a bump on the road.

With reference to FIGS. 1 and 2, when a force is applied to the first sensor 31, the first sensor 31 detects the magnitude of the force and sends a signal indicative of the magnitude of the force to the first parking assistance controller 33, which in turn, sends a control signal to the first auxiliary motor driver 34. The first auxiliary motor 34 drives and controls the speed and the rotating direction of the first auxiliary motor 12 according to the control signal. Similarly, when a force is applied to the second sensor 32, the second sensor 32 detects the magnitude of the force and sends a signal indicative of the magnitude of the force to the second parking assistance controller 33, which in turn, sends a control signal to the second auxiliary motor driver 34. The second auxiliary motor 34 drives and controls the speed and the rotating direction of the second auxiliary motor 22 according to the control signal. The sensor units 3 on the left and right sides of the vehicle 8 control leftward and rightward movement of the vehicle 8. In the preferred form shown in FIGS. 1-6, the sensor unit 3 on the left side of the vehicle 8 controls rightward movement of the vehicle 8, and the sensor unit 3 on the right side of the vehicle 8 controls leftward movement of the vehicle 8.

When force is applied to both first and second sensors 31 and 32 on the same side of the vehicle 8, the whole vehicle 8 is moved leftward or rightward. However, force can be applied to only one of the first and second sensors 31 and 32. For example, when a force is applied to the first sensor 31 on the left side of the vehicle 8, the head of the vehicle 8 is moved rightward. When a force is applied to the second sensor 32 on the left side of the vehicle 8, the rear of the vehicle 8 is moved rightward. On the other hand, when a force is applied to the first sensor 31 on the right side of the vehicle 8, the head of the vehicle 8 is moved leftward. When a force is applied to the second sensor 32 on the right side of the vehicle 8, the rear of the vehicle 8 is moved leftward.

With references to FIGS. 1 and 2, in use, the vehicle 8 is stopped beside a parking space, and the driver can activate the parking assistance system by a switch in the vehicle 8 or a remote control, moving the front and rear auxiliary wheels 11 and 21 of the front and rear auxiliary wheel assemblies 1 and 2 via the lift devices 4. The front and rear auxiliary wheels 11 and 21 are lowered and come into contact with the ground and lift the vehicle 8 so that the front and rear wheels 84 and 86 are above the ground. Then, the driver pushes the vehicle 8 by the first and the second sensors 31 and 32 on one of the left and right sides of the vehicle 8 with forces of suitable magnitudes with both hands. The first and second sensors 31, 32 detect the magnitudes of forces from both hands of the driver. The first and second auxiliary controllers 33 judge the magnitudes of the forces applied and drive and control the power output of the first and second auxiliary motors 12 and 22 of the front and rear auxiliary wheel assemblies 1 and 2, providing auxiliary power in proportion to the magnitudes of the forces applied by the hands of the driver.

The driver can adjust the forces applied through the hands to the vehicle 8 according to the location of the vehicle 8. Thus, the moving distances of the head and the rear of the vehicle 8 can be adjusted at any time, so that the driver can easily push the vehicle 8 into the parking space. The first and second auxiliary motors 12 and 22 can include a braking device to providing a braking effect when required. Furthermore, when no force is applied to the sensor units 3, the vehicle 8 brakes, avoiding the vehicle 8 from slipping downward when the vehicle 8 is on a slope. The front and rear auxiliary wheels 11 and 21 can be moved upward by the lift devices 4 through control of the switch or the remote control.

The driver can apply forces to the first and second sensors 31 and 32 on the other side of the vehicle 8 to push the vehicle 8 out of the parking space. The first and second auxiliary wheels 11 and 21 can be moved upward by the lift devices 4 through control of the switch or the remote control, so that the vehicle 8 can function normally.

Figure 7:
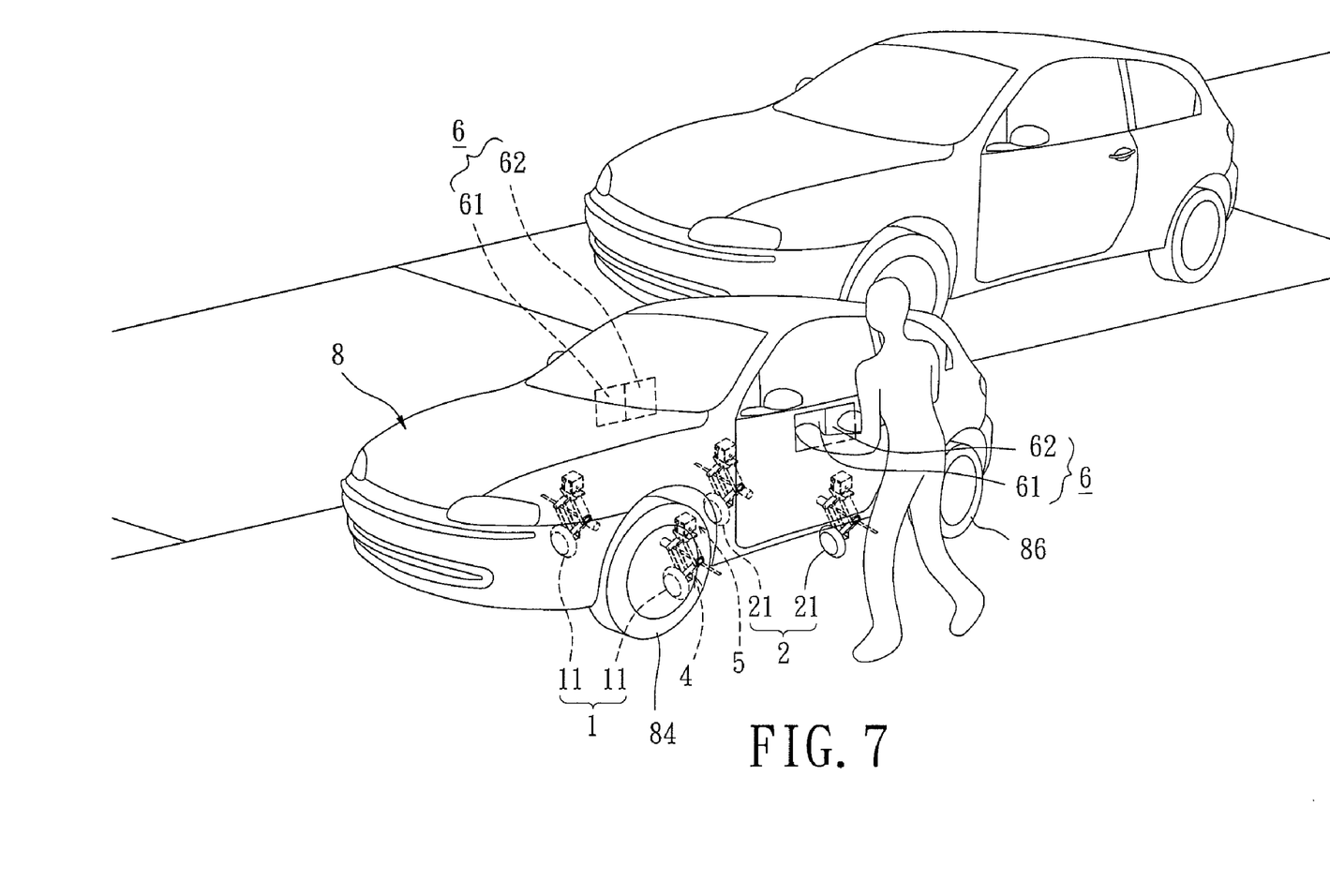
FIG. 7 shows a perspective view of a vehicle with a parking assistance system of a second embodiment according to the preferred teachings of the present invention.

FIG. 7 shows another embodiment of the control unit of the parking assistance system according to the teachings of the present invention. In this embodiment, the control unit includes two sensors 6 respectively on left and right sides of the vehicle 8. Each sensor 6 includes two sensing areas 61 and 62 that are spaced in a horizontal direction in the preferred form shown. Each sensing area 61, 62 is coupled to a parking assistance controller 33, which in turn, is coupled by two auxiliary motor drivers 34 to the auxiliary motors 12 and 22 of the front and rear wheel assemblies 1 and 2. When the sensing area 61, 62 is subjected to a force, the magnitude of the force is detected, and a signal indicative of the magnitude of the force is sent to the parking assistance controller 33. After judgment, the parking assistance controller 33 sends a control signal to one or both of the auxiliary motor drivers 34 to drive and control the speed and rotating direction of the auxiliary motors 12 and 22. Thus, the moving distance and the direction of the auxiliary wheels 11 and 21 can be controlled.

Figure 8:
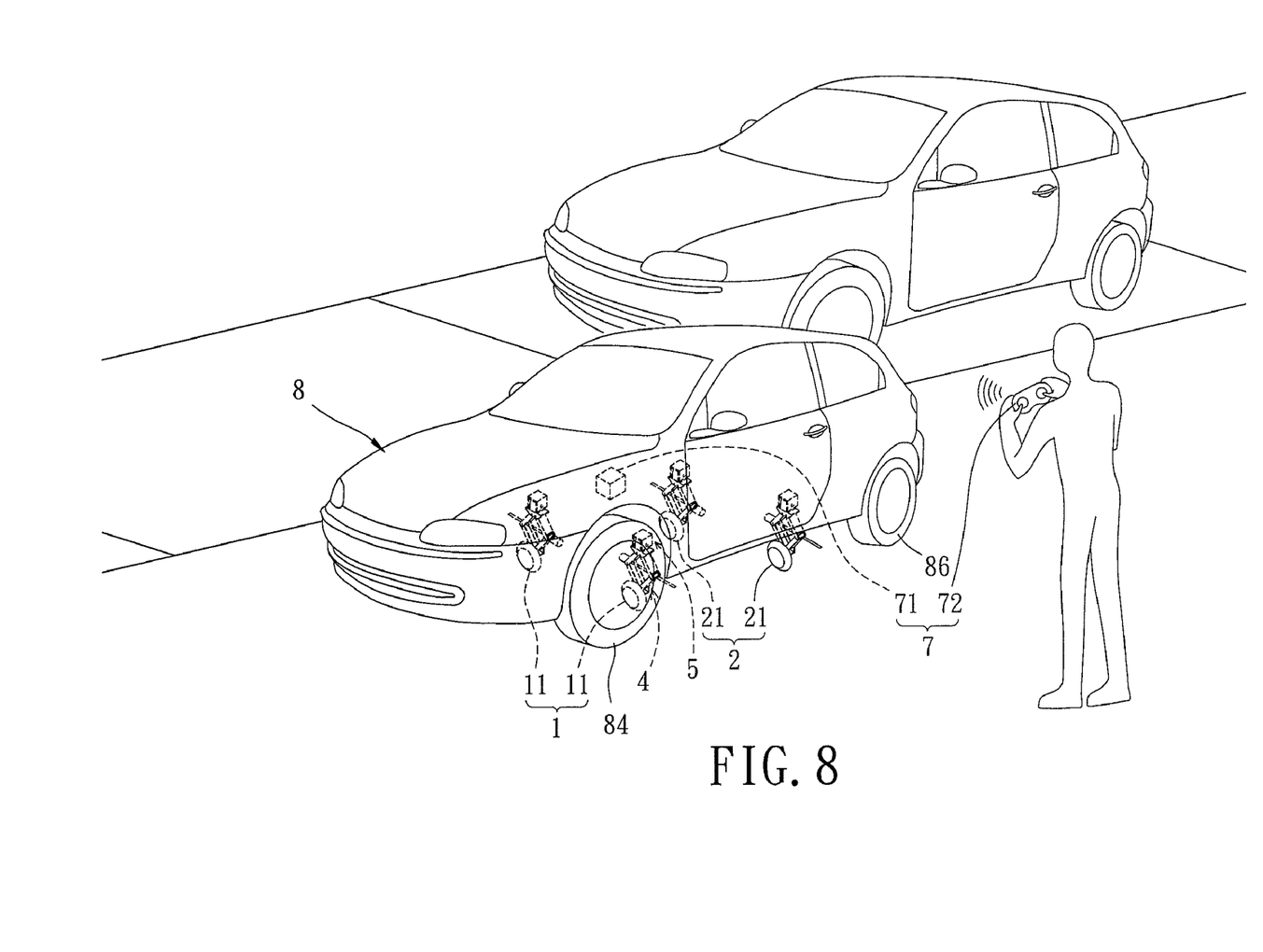
FIG. 8 shows a perspective view of a vehicle with a parking assistance system of a third embodiment according to the preferred teachings of the present invention.

FIG. 8 shows a further embodiment of the control unit of the parking assistance system according to the teachings of the present invention. In this embodiment, the control unit is in the form of a controller 7 including a receiver 71 and a transmitter 72. The receiver 71 receives wireless signals from the transmitter 72 and is coupled to a parking assistance controller 33, which in turn, is coupled by two auxiliary motor drivers 34 to the auxiliary motors 12 and 22 of the front and rear wheel assemblies 1 and 2. The transmitter 72 includes a plurality of buttons to control the speed and rotating direction of the auxiliary motors 12 and 22. Thus, the moving distance and the direction of the auxiliary wheels 11 and 21 can be controlled.

Figure 9:
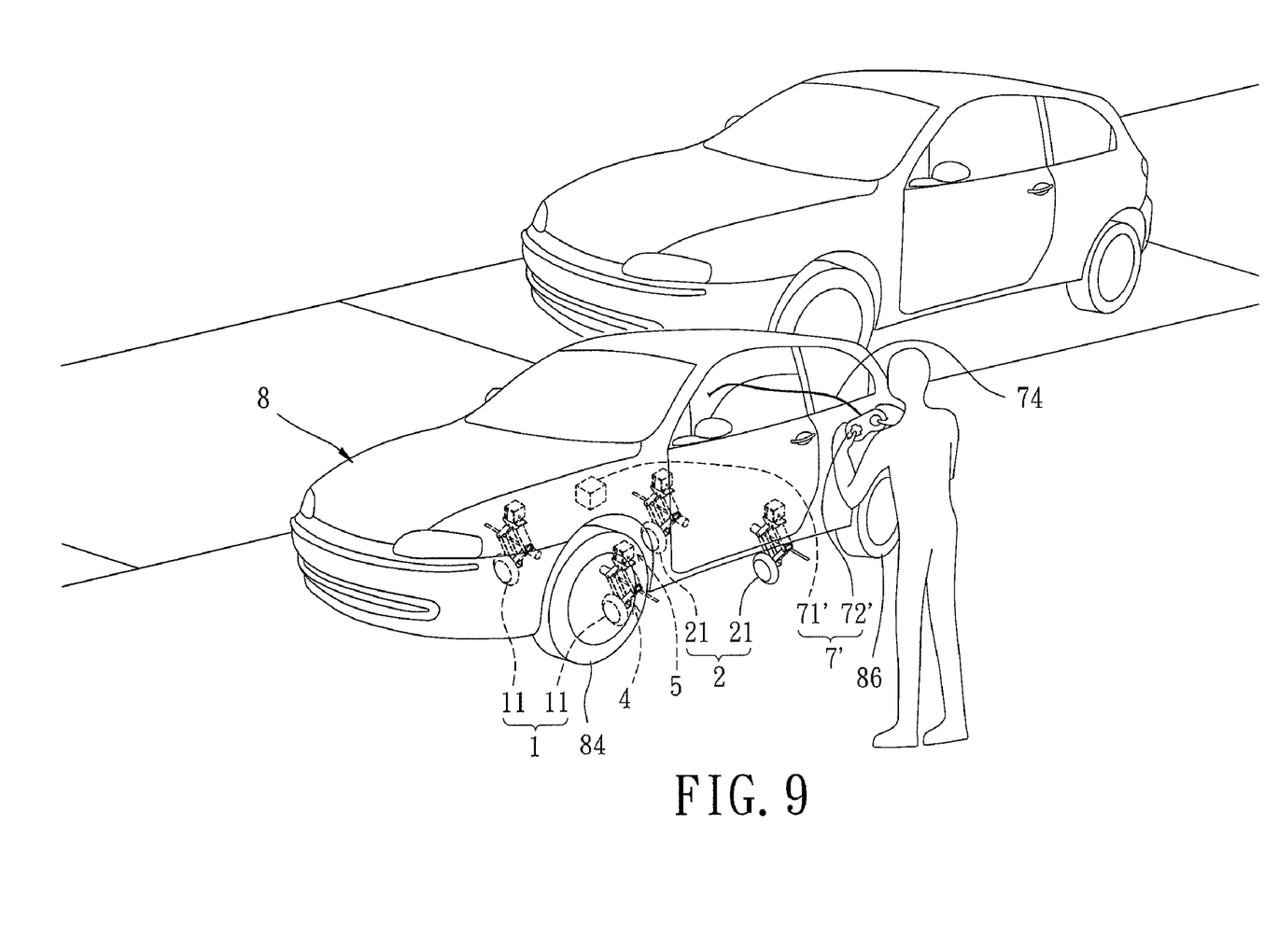
FIG. 9 shows a perspective view of a vehicle with a parking assistance system of a fourth embodiment according to the preferred teachings of the present invention.
Figure 10:
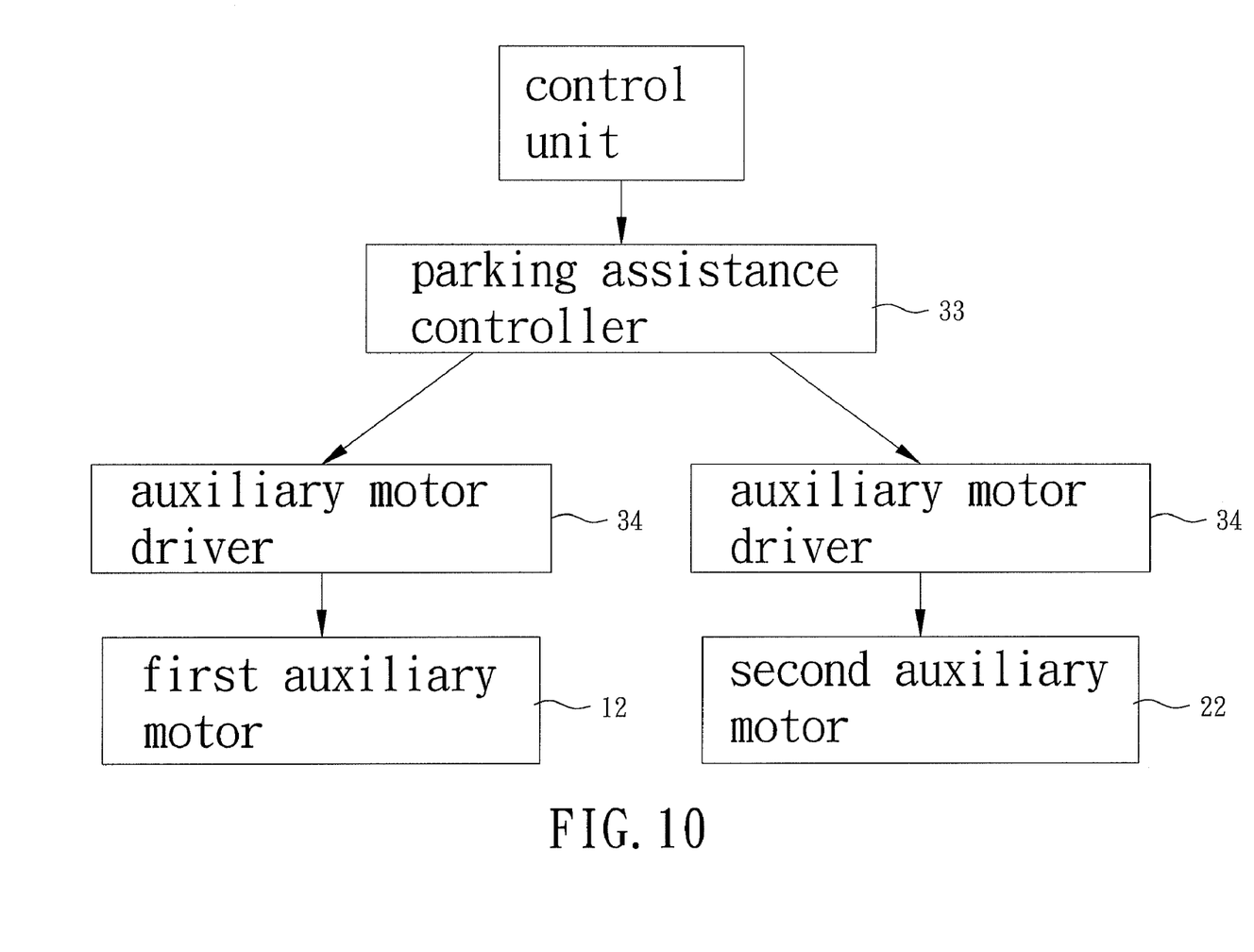
FIG. 10 shows a block diagram illustrating components utilized in the parking assistance systems of FIGS. 7-9.

FIG. 9 shows still another embodiment of the control unit of the parking assistance system according to the teachings of the present invention. In this embodiment, the control unit is in the form of a controller 7' including a receiver 71' and a transmitter 72' electrically connected to the receiver 71' by a wire 74. The receiver 71' receives signals from the transmitter 72' and is coupled to a parking assistance controller 33, which in turn, is coupled by two auxiliary motor drivers 34 to the auxiliary motors 12 and 22 of the front and rear wheel assemblies 1 and 2. The transmitter 72' includes a plurality of buttons to control the speed and rotating direction of the auxiliary motors 12 and 22. Thus, the moving distance and the direction of the auxiliary wheels 11 and 21 can be controlled.

Thus, the parking assistance system according to the preferred teachings of the present invention allows the driver to easily and rapidly move the vehicle 8 to the best location in the parking space without the need of parking skill and experience. The moving speed and direction of the vehicle 8 can be adjusted at any time according to the practical situations.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A parking assistance system for a vehicle comprising:
   a front auxiliary wheel assembly adapted to be mounted to a chassis of the vehicle and adjacent to two front wheels of the vehicle, with the front auxiliary wheel assembly including two front auxiliary wheels and a first auxiliary motor coupled to the two front auxiliary wheels, with at least one of the two front auxiliary wheels being drivable by the first auxiliary motor to rotate in a forward or backward direction;
   a rear auxiliary wheel assembly adapted to be mounted to the chassis of the vehicle and adjacent two rear wheels of the vehicle, with the rear auxiliary wheel assembly including two rear auxiliary wheels and a second auxiliary motor coupled to the two rear auxiliary wheels, with at least one of the two rear auxiliary wheels being drivable by the second auxiliary motor to rotate in the forward or backward direction;
   a plurality of lift devices mounted between the front and rear auxiliary wheels and the chassis, with the plurality of lift devices controlling upward and downward movement of the front and rear auxiliary wheels between a first position above the ground and a second position on the ground, with the front and rear wheels of the vehicle being above the ground when the front and rear auxiliary wheels are in the second position, and with the front and rear wheels of the vehicle being on the ground when the front and rear auxiliary wheels are in the first position;
   a first auxiliary motor driver coupled to the first auxiliary motor,
   a second auxiliary motor driver coupled to the second auxiliary motor;
   at least one parking assistance controller coupled to the first and second auxiliary motor drivers; and
   a control unit coupled to said at least one parking assistance controller, with the control unit being manually operable to control a rotating direction and speed of the first and second auxiliary motors via said at least one Parking assistance controller, controlling a moving distance and direction of the front and rear auxiliary wheels in the forward or backward direction;
   with said at least one parking assistance controller including first and second parking assistance controllers respectively coupled to the first and second auxiliary motor drivers, with the control unit including first and second sensor units adapted to be mounted on left and right sides of the vehicle, with each of the first and second sensor units including a first sensor coupled to the first auxiliary motor and a second sensor coupled to the second auxiliary motor.

2. A parking assistance system for a vehicle comprising:
   a front auxiliary wheel assembly adapted to be mounted to a chassis of the vehicle and adjacent to two front wheels of the vehicle, with the front auxiliary wheel assembly including two front auxiliary wheels and a first auxiliary motor coupled to the two front auxiliary wheels, with at least one of the two front auxiliary wheels being drivable by the first auxiliary motor to rotate in a forward or backward direction;
   a rear auxiliary wheel assembly adapted to be mounted to the chassis of the vehicle and adjacent two rear wheels of the vehicle, with the rear auxiliary wheel assembly including two rear auxiliary wheels and a second auxiliary motor coupled to the two rear auxiliary wheels, with at least one of the two rear auxiliary wheels being drivable by the second auxiliary motor to rotate in the forward or backward direction;
   a plurality of lift devices mounted between the front and rear auxiliary wheels and the chassis, with the plurality of lift devices controlling upward and downward movement of the front and rear auxiliary wheels between a first position above the ground and a second position on the ground, with the front and rear wheels of the vehicle being above the ground when the front and rear auxiliary wheels are in the second position, and with the front and rear wheels of the vehicle being on the ground when the front and rear auxiliary wheels are in the first position;
   a first auxiliary motor driver coupled to the first auxiliary motor;
   a second auxiliary motor driver coupled to the second auxiliary motor;
   at least one parking assistance controller coupled to the first and second auxiliary motor drivers; and
   a control unit coupled to said at least one parking assistance controller, with the control unit being manually operable to control a rotating direction and speed of the first and second auxiliary motors via said at least one parking assistance controller, controlling a moving distance and direction of the front and rear auxiliary wheels in the forward or backward direction;
   with said at least one parking assistance controller including a parking assistance controller coupled to the first and second auxiliary motor drivers, with the control unit including first and second sensors adapted to be mounted on left and right sides of the vehicle, with each of the first and second sensors including a first sensing area coupled to the first auxiliary motor and a second sensing area coupled to the second auxiliary motor.

3. The parking assistance system as claimed in claim 1, with the first and second sensors of each of the first and second sensor units located on a same level and spaced from each other, with the first sensor adjacent a head of the vehicle, and with the second sensor adjacent a rear of the vehicle.

4. The parking assistance system as claimed in claim 1, with each of the first and second auxiliary motors including a braking device.

5. A parking assistance system for a vehicle comprising:
   a front auxiliary wheel assembly adapted to be mounted to a chassis of the vehicle and adjacent to two front wheels of the vehicle, with the front auxiliary wheel assembly including two front auxiliary wheels and a first auxiliary motor coupled to the two front auxiliary wheels, with at least one of the two front auxiliary wheels being drivable by the first auxiliary motor to rotate in a forward or backward direction;

a rear auxiliary wheel assembly adapted to be mounted to the chassis of the vehicle and adjacent two rear wheels of the vehicle, with the rear auxiliary wheel assembly including two rear auxiliary wheels and a second auxiliary motor coupled to the two rear auxiliary wheels, with at least one of the two rear auxiliary wheels being drivable by the second auxiliary motor to rotate in the forward or backward direction;

a plurality of lift devices mounted between the front and rear auxiliary wheels and the chassis, with the plurality of lift devices upward and downward movement of the front and rear auxiliary wheels between a first position above the ground and a second position on the ground, with the front and rear wheels of the vehicle being above the ground when the front and rear auxiliary wheels are in the second position, and with the front and rear wheels of the vehicle being on the ground when the front and rear auxiliary wheels are in the first position;

a first auxiliary motor driver coupled to the first auxiliary motor;

a second auxiliary motor driver coupled to the second auxiliary motor;

at least one parking assistance controller coupled to the first and second auxiliary motor drivers; and a control unit coupled to said at least one parking assistance controller, with the control unit being manually operable to control a rotating speed of the first and second auxiliary motors via said at least one parking assistance controller, controlling a moving distance and direction of the front and rear auxiliary wheels in the forward or backward direction;

with a folding device being mounted between chassis of the vehicle and each lift device.

* * * * *